June 5, 1951  G. M. KRIEGBAUM  2,555,549
IMPLEMENT LIFTING DEVICE
Filed March 26, 1945
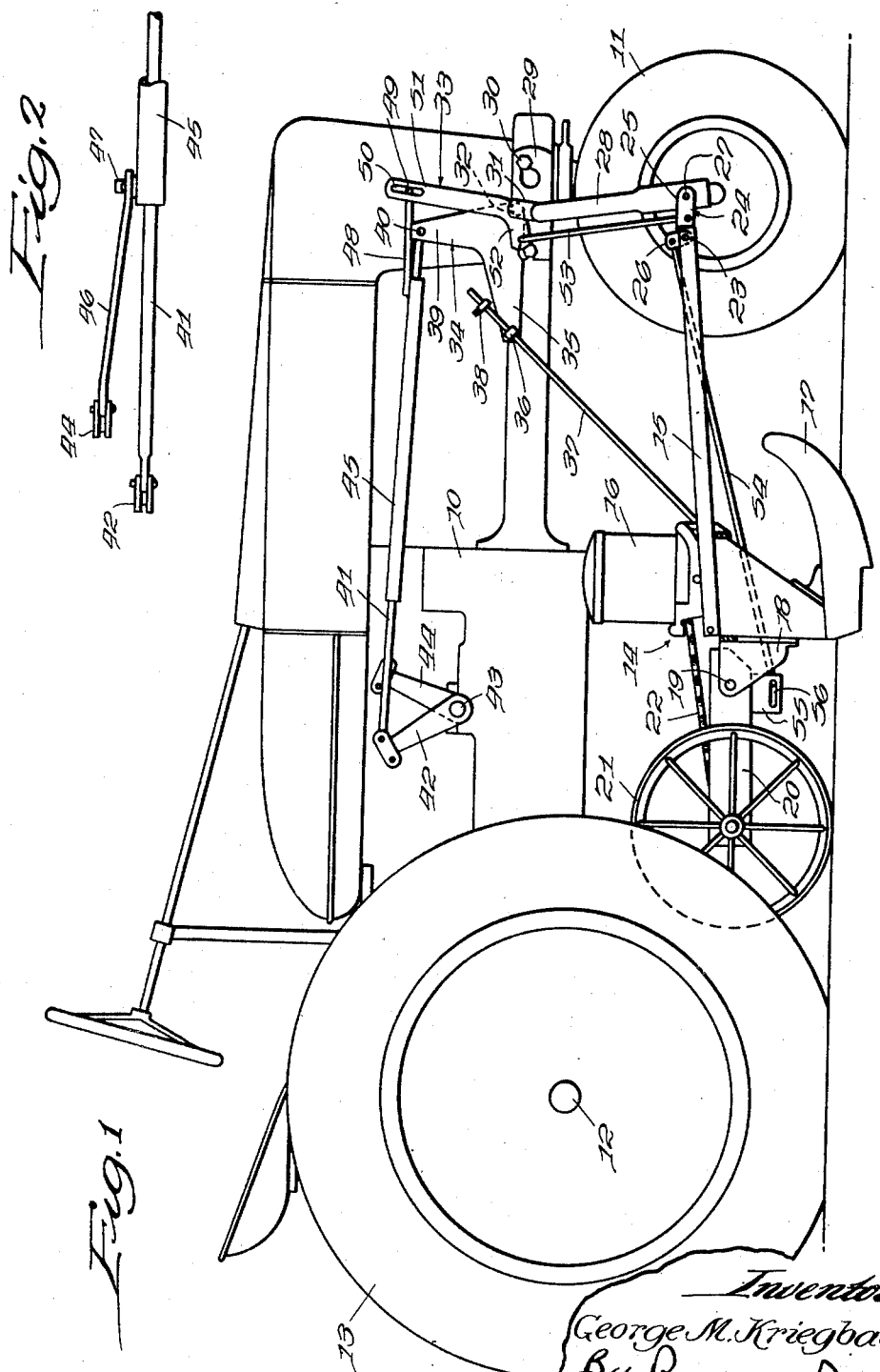
Inventor:
George M. Kriegbaum.
By Paul O. Pippel
Attorney.

Patented June 5, 1951

2,555,549

UNITED STATES PATENT OFFICE 2,555,549

IMPLEMENT LIFTING DEVICE

George M. Kriegbaum, Richmond, Ind., assignor to International Harvester Company, a corporation of New Jersey Application March 26, 1945, Serial No. 584,863

5 Claims. (Cl. 97—50)

This invention relates to tractor-mounted agricultural implements and particularly to control mechanism therefor. More specifically, the invention concerns tractor-mounted planters.

An object of the invention is the provision of an improved tractor-mounted planter having means on the tractor for determining the depth at which seed or other material is to be deposited in the ground.

Another object is to provide in a planter having a furrow opener and a ground-engaging wheel to determine the depth at which seed is to be deposited, means for controlling the position of the wheel with respect to the furrow opener, and including lost motion to permit the wheel to be displaced downwardly with respect to the furrow opener when traveling on uneven terrain.

Another object is to provide, in combination with means for controlling the depth of operation of a furrow opener, means for maintaining the furrow opener level.

Another object is to provide novel control connections between the tractor and an implement.

A further object is to provide in a planter having at least two adjustments controlled from a tractor or the like, novel connections including a connecting rod for effecting one adjustment, and a sleeve loose on the rod for effecting the other adjustment.

Other objects and advantages will become clear from the following detailed description when read in conjunction with the accompanying drawings, wherein:

Figure 1 is a view in side elevation of a tractor having mounted thereupon a planter embodying the features of the present invention; and Figure 2 is a plan view of a portion of the lifting linkage.

Referring to the drawings, numeral 10 designates the longitudinally extending body of a tractor having front wheels 11, rear axle 12, and rear drive wheels 13. The tractor has mounted thereupon for movement with respect thereto, between operating and transport positions, a planter having a frame 14 including a longitudinally extending hitch structure 15. While the essential elements of the present invention are shown in the drawings, it should be understood the planter may comprise a number of operating units such as that shown, and is of the general type disclosed in copending United States application Serial No. 584,900, filed March 26, 1945. Frame 14 has mounted thereupon a conventional receptacle 16 for depositing seed, fertilizer, or other material in the soil. Also mounted on the frame is a furrow opener 17 adapted to open a furrow in the soil to receive the material dispensed from the container 16. Secured to the frame 14 and extending rearwardly therefrom is a bracket 18 and pivoted thereupon at 19 is the forward end of a frame member 20 supporting at the rear end thereof a wheel 21. Wheel 21 travels directly behind the furrow opener 17 and functions to cover the material deposited in the furrow. It is also utilized to determine the depth of operation of the opener 17 and therefore the depth at which material is to be deposited in the furrow. The wheel 21 is adapted for swinging movement vertically about the pivot 19, but this swinging movement is controlled in a manner hereinafter described. The material dispenser is provided with a conventional seed plate structure (not shown) for controlling the deposition of material, and this structure is driven in a manner well known in the art through a drive chain 22 connected with the wheel 21, which thus drives the planter by virtue of its contact with the ground.

The forward end of hitch structure 15 is pivotally connected at 23 to a bell-crank 24 having a long arm 25 and a short upwardly projecting arm 26. The forward end of arm 25 is pivotally connected at 27 to the lower portion of a depending arm 28. The upper end of arm 28 is bent inwardly and secured to a plate 29 removably attached to the side of the tractor body by bolts 30.

The inwardly bent portion of the upper end of arm 28 is provided with one or more upwardly projecting lugs 31 having a transversely extending shaft 32 secured thereto. Loosely mounted upon the shaft 32 are a pair of independently pivotable bell-cranks 33 and 34. Bell-crank 34 has a rearwardly extending arm 35 to the end of which is secured a swivel 36 having an opening therethrough to slidingly receive one end of a link 37. Link 37 extends downwardly and is connected to the frame 14 of the planter. The upper end of link 37 which extends through swivel 36 is provided with a collar 38 which is adjustable to provide a stop member adapted to abut against the swivel 36 and limit the movement in one direction of the link 37.

The upper arm 39 of bell-crank 34 has pivotally connected to the upper end thereof at 40 the forward end of a longitudinally extending connecting rod 41, the rear end of which is connected to a rock arm 42 pivoted at 43 upon the side of the tractor for rocking movement in a generally forward and rearward direction. Rock arm 42 is actuated in a suitable manner, not shown, but preferably by a double-acting hydraulic cylinder operated from the tractor power plant and capable of holding the arm 42 in any adjusted position. Forward rocking movement of rock arm 42 causes a bell-crank 34 to pivot in a clockwise direction to lift the planter to transport position upon the tractor.

Another rock arm 44 is mounted coaxially with rock arm 42 and is independently powered in a manner similar to arm 42. Connecting rod 41 is provided with a sleeve member 45, and rock arm 44 is connected to the rear end thereof by a link 46, clearly shown in Figure 2. The forward end of link 46 is removably secured to a stud 47 on the sleeve 45. The forward end of sleeve 45 is provided with an extension 48 extending forwardly in a direction generally parallel to the rod 41 and having a bent end 49 received in a slot 50 in the upwardly extending arm 51 of bell-crank 33.

Thus it should be clear that while rock arm 42 moves in a generally forward and rearward direction to pivot the bell-crank 34 and raise or lower the planter, the rock arm 44 likewise rocks generally forwardly and rearwardly and transmits motion through a mechanism coaxial with connecting rod 41 to the bell-crank 33. The slot 50 is provided to compensate for the difference in the heights of pivot 40 and the end 49 of member 48, as well as the difference in the arcs of movement thereof.

Bell-crank 33 is provided with a short rearwardly extending arm 52 to which is pivoted the upper end of a link 53. The lower end of link 53 is pivoted to the arm 25 of bell-crank 24 at a location between the pivots 23 and 27. Rocking of arm 44, therefore, acting through sleeve 45, bell-crank 33 and link 53, pivots bell-crank 24 about the point 27. The arm 26 of bell-crank 24 is connected by a link 54 to a lug 55 secured to and depending from the forward portion of member 20. Lug 55 is provided with a longitudinally extending slot 56 to receive the bent end of link 54. In a normal operating position of the planter, the bent end of the link 54 abuts the forward end of the slot 56 so that wheel 21 will not move upwardly with respect to the frame 14. A certain amount of free downward movement of the wheel with respect to the frame is permitted by slot 56. This is important so that the wheel 21 will not rise off the ground when a hill is encountered by the furrow opener 17, but will move downwardly and remain in driving engagement with the ground so that the operation of the dispensing mechanism will not be interrupted.

Swinging movement of the wheel 21 in order to determine the depth of operation of the opener 17 and therefore the depth at which material from receptacle 16 is to be deposited, is controlled by the rock arm 44 acting through sleeve 45, bell-cranks 33 and 24, and the link 54. However, were depth adjustment made solely by adjusting the position of the wheel 21 with respect to the planter frame 15 while the frame swung about a fixed pivot 23, the pitch of furrow opener 17 would vary with the movement of the wheel, and material from the container 16 would be deposited at non-uniform depths. In order to maintain the material depositing structure level during depth adjustment the bell-crank 24 is provided for connecting the front end of frame 15 to the arm 28. When bell-crank 33 is rocked in a counter-clockwise direction to increase the depth of planting, the bell-crank 24 is likewise rotated counter-clockwise about the pivot 27, thus lowering the front end of the frame to compensate for the lowering of the rear end of the frame when the wheel swings upwardly. Thus, the planter stays level at all depths of operation.

It should now be understood that a novel tractor-mounted planter adapted to be mounted between the front and rear wheels of a tractor and at the sides thereof has been provided, having novel means for the control of the operation thereof. Likewise the saving in space incident to the use of coaxial connecting means for transmitting power from the rock arms 42 and 44 to the bell-cranks 33 and 34 should be obvious. This permits operation of the lifting mechanism with a minimum of interference with the tractor parts.

By virtue of the sliding connection of link 37 with bell-crank 34, the planter has free movement about the pivot 23, and while movement of bell-crank 33 causes movement of bell-crank 24 about its pivot 27, the pivotal connection of link 54 with arm 26 is so close to the pivot 23 that substantially no movement is imparted to the wheel 21 when the planter is raised to inoperative position.

The invention has been described in its preferred embodiment. However, modifications may be made therein without departing from the spirit of the invention or the scope of the appended claims.

What is claimed is:

1. In an earth-working machine, in combination, a tractor, a working tool having at least two adjustments connected to the tractor, a pair of spaced levers pivoted on the side of the tractor on a transverse axis, means connecting one of said levers with the working tool to effect one of said adjustments, means connecting the other lever with the working tool to effect another of said adjustments, a pair of power actuated rock arms on the side of the tractor on an axis longitudinally spaced from the axis of said levers and independently operable with respect to each other and to said levers, and thrust means movable longitudinally on a common axis connecting said rock arms to said levers for independent operation of the latter.

2. In an earth-working machine, in combination, a tractor, a working tool having at least two adjustments connected to the tractor, a pair of spaced levers pivoted on the side of the tractor on a transverse axis, means connecting one of said levers with the working tool to effect one of said adjustments, means connecting the other lever with the working tool to effect another of said adjustments, a pair of power actuated rock arms on the side of the tractor on an axis longitudinally spaced from the axis of said levers and independently operable with respect to each other and to said levers, and thrust means movable longitudinally on a common axis connecting said rock arms to said levers for independent operation of the latter, said last-mentioned means comprising a sleeve connecting one said rock arm to one said lever, and a shaft slidable in said sleeve and connecting the other rock arm to the other lever.

3. In an earth-working machine, in combination, a tractor, a working tool having at least two adjustments connected to the tractor, a pair of spaced independently operable power actuated rock arms on the side of the tractor, and connecting means between the rock arms and the implement to perform said adjustments, including a thrust rod connected with one said rock arm for effecting one said adjustment, and a sleeve longitudinally slidable on the rod connected to the other rock arm for effecting the other said adjustment.

4. The combination with a tractor having a longitudinally extending body and front and rear wheels, of an implement positioned between front and rear wheels of the tractor and having at least two adjustments, longitudinally extending draft means on the implement connected at its forward end to the forward portion of the tractor for floating movement with respect thereto, means serving as a pair of levers pivoted coaxially to the forward portion of the tractor, connecting means between the levers and the implement for effecting said adjustments, power actuated rock arms mounted on the tractor on a common axis rearwardly of said levers, said rock arms being independently operable with respect to each other and to said levers, and longitudinally extending thrust links movable longitudinally on a common axis connecting said arms to said levers for independent operation of the latter.

5. The combination with a tractor having a longitudinally extending body and front and rear wheels, of an implement positioned between front and rear wheels of the tractor and having at least two adjustments, longitudinally extending draft means on the implement connected at its forward end to the forward portion of the tractor for floating movement with respect thereto, means serving as a pair of levers pivoted to the forward portion of the tractor, connecting means between the levers and the implement for effecting said adjustments, power actuated rock arms mounted on the tractor on a common axis rearwardly of said levers, said rock arms being independently operable with respect to each other and to said levers, and longitudinally extending thrust links connecting said arms to said levers for independent operation of the latter, said links comprising a rod connecting one arm to one lever, and a sleeve on the rod connecting the other arm to the other lever.

GEORGE M. KRIEGBAUM.

REFERENCES CITED

The following references are of record in the file of this patent:

UNITED STATES PATENTS

| Number | Name | Date |
|---|---|---|
| 829,402 | Huff | Aug. 28, 1906 |
| 1,760,128 | Enz | May 27, 1930 |
| 1,761,658 | Copeland | June 3, 1930 |
| 1,910,187 | Sneed | May 23, 1933 |
| 1,943,778 | White | Jan. 16, 1934 |
| 1,962,349 | Johnson | June 12, 1934 |
| 2,220,338 | Koebel | Nov. 5, 1940 |
| 2,363,292 | Brown | Nov. 21, 1944 |
| 2,368,125 | Evans | Jan. 30, 1945 |